United States Patent
Peter et al.

(10) Patent No.: US 7,031,056 B2
(45) Date of Patent: Apr. 18, 2006

(54) OPERATING KNOB FOR AN OPTICAL SYSTEM

(75) Inventors: Kajta Peter, Wetzlar (DE); Phillip Boehmel, Dresden (DE); Christian Knoll, Stuttgart (DE); Dietmar Kempf, Schoenaich (DE)

(73) Assignees: Leica Microsystems Wetzlar GmbH, Wetzlar (DE); FraunhoferGesellschaft zur Forgerung der Angewandten Forschung E.V., (DE)

( * ) Notice: Subject to any disclaimer, the term of this patent is extended or adjusted under 35 U.S.C. 154(b) by 62 days.

(21) Appl. No.: 10/815,066

(22) Filed: Mar. 31, 2004

(65) Prior Publication Data

US 2004/0218265 A1    Nov. 4, 2004

(30) Foreign Application Priority Data

Apr. 1, 2003  (DE) ................................ 103 14 752

(51) Int. Cl.
G02B 21/26    (2006.01)

(52) U.S. Cl. .................................... 359/392
(58) Field of Classification Search ................ 359/368, 359/382, 383, 391–393
See application file for complete search history.

(56) References Cited

U.S. PATENT DOCUMENTS

| | | | | |
|---|---|---|---|---|
| 4,482,221 A | * | 11/1984 | Clark | 359/392 |
| 4,616,517 A | * | 10/1986 | Esmay | 74/10.45 |
| 4,619,503 A | | 10/1986 | Reinheimer et al. | 350/511 |
| 5,552,321 A | | 9/1996 | Focht | 435/286.1 |
| 6,064,519 A | | 5/2000 | Otomo et al. | 359/392 |
| 6,512,632 B1 | * | 1/2003 | Yamamoto | 359/383 |
| 2002/0159147 A1 | | 10/2002 | Yamamoto | 359/392 |

FOREIGN PATENT DOCUMENTS

| | | |
|---|---|---|
| DE | 10126291 | 12/2002 |
| EP | 0388812 B1 | 3/1990 |
| JP | 07234351 A * | 9/1995 |

* cited by examiner

Primary Examiner—Mark A. Robinson
(74) Attorney, Agent, or Firm—Simpson & Simpson, PLLC

(57) ABSTRACT

An operating knob (20) for an optical system (100) is disclosed. The operating knob (20) has a first and a second coaxially arranged rotating element (21, 22). The first and the second rotating element (21, 22) have at least partly conical form. The first rotating element (21) has at the side directly opposing the second rotating element (22) a larger diameter than the second rotating element (22) and a step is formed at the side of the second rotating element (22) directly opposing the first rotating element (21), wherein the step possesses a diameter which is approximately the diameter of the first rotating element.

16 Claims, 5 Drawing Sheets

OPERATING KNOB FOR AN OPTICAL SYSTEM

CROSS REFERENCE TO RELATED APPLICATIONS

The invention claims priority of the German patent application 103 14 752.7 which is incorporated by reference herein.

FIELD OF THE INVENTION

The present invention concerns an operating knob for an optical system. The invention concerns as well a microscope with an operating knob.

BACKGROUND OF THE INVENTION

Normally, focus knobs are designed as coaxially arranged rotating elements which are mounted aside the microscope, whereby the larger focus knob actuates the coarse focus and the smaller focus knob actuates the fine focus.

State of the art focus drives often have the disadvantage that conditionally to too small circumferential surfaces in the area of the coarse focus drive no safe gripping of the coarse focus drive is possible. Additionally, too extending fine focus drives interfere with the fingers while actuating the coarse focus drive. A too conical form of both rotating elements leads to an axial slipping of the actuating fingers. Also a too strong surface profile affects the tactile sensitiveness of the fingers tips disadvantageously in the long term, and the adhesive friction between the user's hand and the rotating element is unnecessarily reduced, which reduces the adjusting accuracy and additionally brings about the danger that the user unintentionally actuates the coarse focus while actuating the fine focus. The reason is that both rotating elements are arranged in a way to each other that the smaller focus drive penetrates the larger coarse focus drive as a cylinder and thus the abutting face of the coarse focus drive can be touched while the fine focus is being actuated, and thus the coarse focus drive is actuated unintentionally.

This occurs especially to microscopes with a non-mechanical transmission (in the case of a mechanical transmission the coarse focus moves so clumsily that this danger hardly exists). It happens more to those microscopes which have a motor control for the coarse and fine focus knobs. Concerning these microscopes, the focus drives move almost friction-free, which enables unintentional actuation, and which may lead to the damage to or even the demolition of the sample and/or of the optical system in the worst case. Concerning state of the art focus drives, this effect of the unintentional actuation of the coarse focus drive is also increased by that the rotating element for the fine focus drive by a haptic way indicates insufficiently how close already the fingers of the user are to the abutting face of the coarse focus drive.

SUMMARY OF THE INVENTION

It is the object of the invention is to create a coaxial operating knob for an optical system which allows an ergonomic operation and thereby ensures that inadvertent faulty operation is impossible.

According to the invention, the above object is solved by an operating knob for an optical system which comprises: a first and a second coaxially arranged rotating element, wherein the first and the second rotating element are independently rotatable, the first rotating element rests against the optical system, the second rotating element is arranged downstream of the first rotating element, the first and the second rotating element have at least partly conical form, and that the first rotating element has one side directly opposing the second rotating element and has a larger diameter than the second rotating element and a step is formed at the side of the second rotating element directly opposing the first rotating element, wherein the step possesses a diameter which is approximately the diameter of the first rotating element.

It is a further object of the invention is to provide a microscope with an operating knob which allows an ergonomic operation of the microscope.

According to the invention, the above object is solved by a microscope comprising: a first and a second coaxially arranged rotating element, wherein the first and the second rotating element are independently rotatable, the first rotating element rests against the optical system, the second rotating element is arranged downstream of the first rotating element, the first and the second rotating element have at least partly conical form, and that the first rotating element has one side directly opposing the second rotating element and has a larger diameter than the second rotating element and a step is formed at the side of the second rotating element directly opposing the first rotating element, wherein the step possesses a diameter which is approximately the diameter of the first rotating element.

The invention has the advantage that the operating knob has a first and a second rotating element, whereby the second rotating element at the side directly opposing the first rotating element forms a circumferential step which has approximately the size of the diameter of the first rotating element.

The first and the second rotating element each define a circumferential surface. For both rotating elements the circumferential surfaces provide a sufficient gripping area. The geometry is chosen such that users with small fingers do not interfere with the second rotating element (fine focus drive) while actuating the coarse focus drive (first rotating element). The conical form of the rotating elements is chosen such that the fingers do not slip off and that there is still a comfortable diameter variance for persons with different hand sizes. The first rotating element (coarse focus) cannot be rotated unintentionally while actuating the second rotating element (fine focus). The user gets a clear tactile response when his/her fingers approach the end of one of the two rotating elements.

It is of particular advantage if the operating knob is provided at a microscope. In one embodiment, the first and the second rotating elements each have a profile in the form of grooves, notches or ribs at the circumferential surface. In another embodiment, the first and the second rotating elements each have a rubber inlay at the circumferential surface.

More advantageous features of the invention are disclosed in the dependent claims.

BRIEF DESCRIPTION OF THE DRAWINGS

There are various ways of advantageously embodying and developing the teaching of the present invention. Reference is made to the drawings. In the drawings.

DETAILED DESCRIPTION OF THE INVENTION

Figure 1:
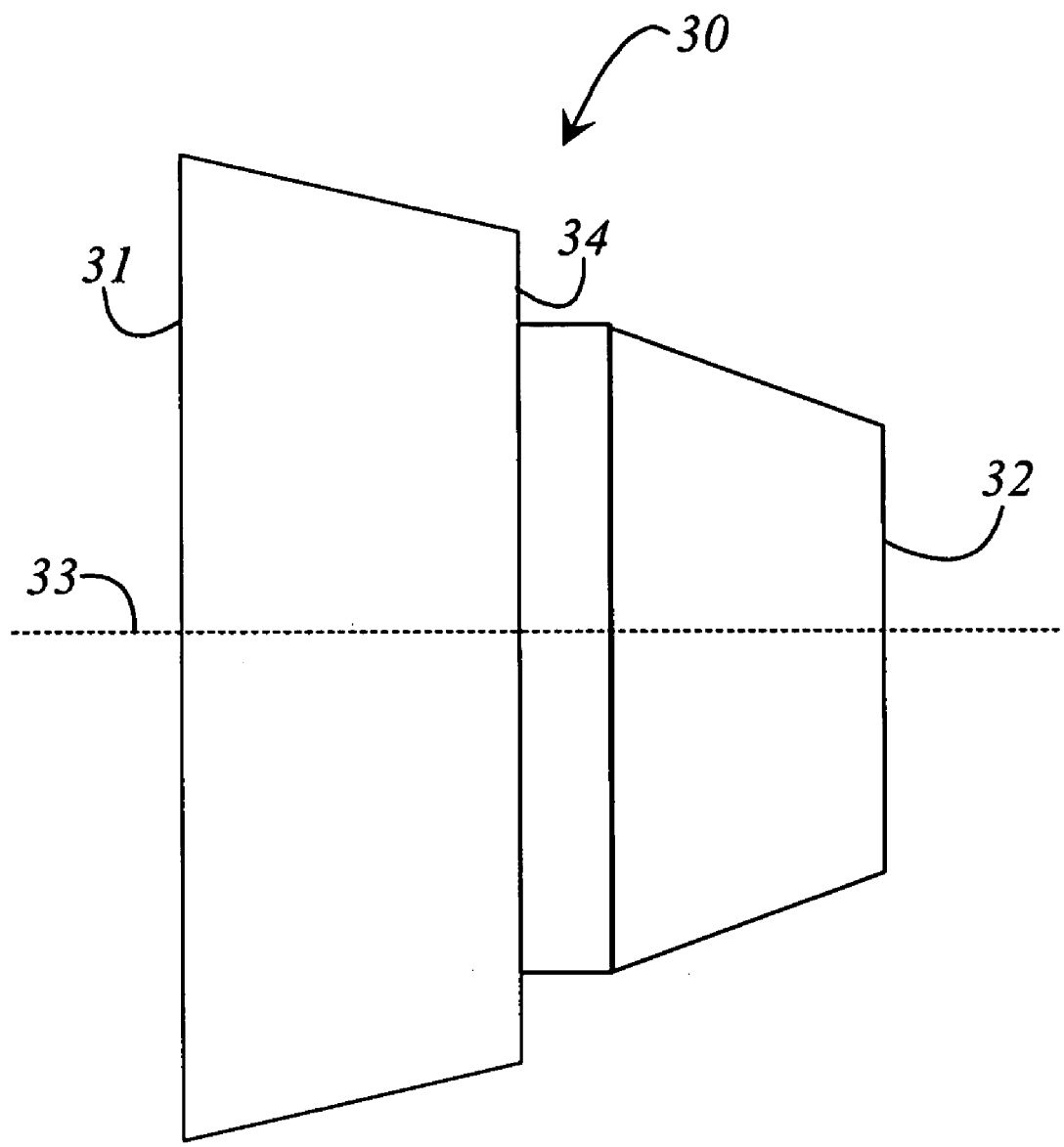
FIG. 1: a side view of an operating knob for an optical system according to state of the art.

FIG. 1 shows an operating knob 30 according to state of the art which has a first and a second rotating element 31 and 32. The first and the second rotating element 31 and 32 are arranged coaxially around an axis 33. The first rotating element 31 has a larger diameter than the second rotating element 32. For the usual embodiments of the coaxial arrangement of the rotating elements 31 and 32 the first rotating element 31 is responsible for the coarse focus drive and the second rotating element 32 is responsible for the fine focus drive. In essence, the first and the second rotating element 31 and 32 have a conical form. The first rotating element 31 has a front area 34 which is opposite to the second rotating element 32.

Figure 2:
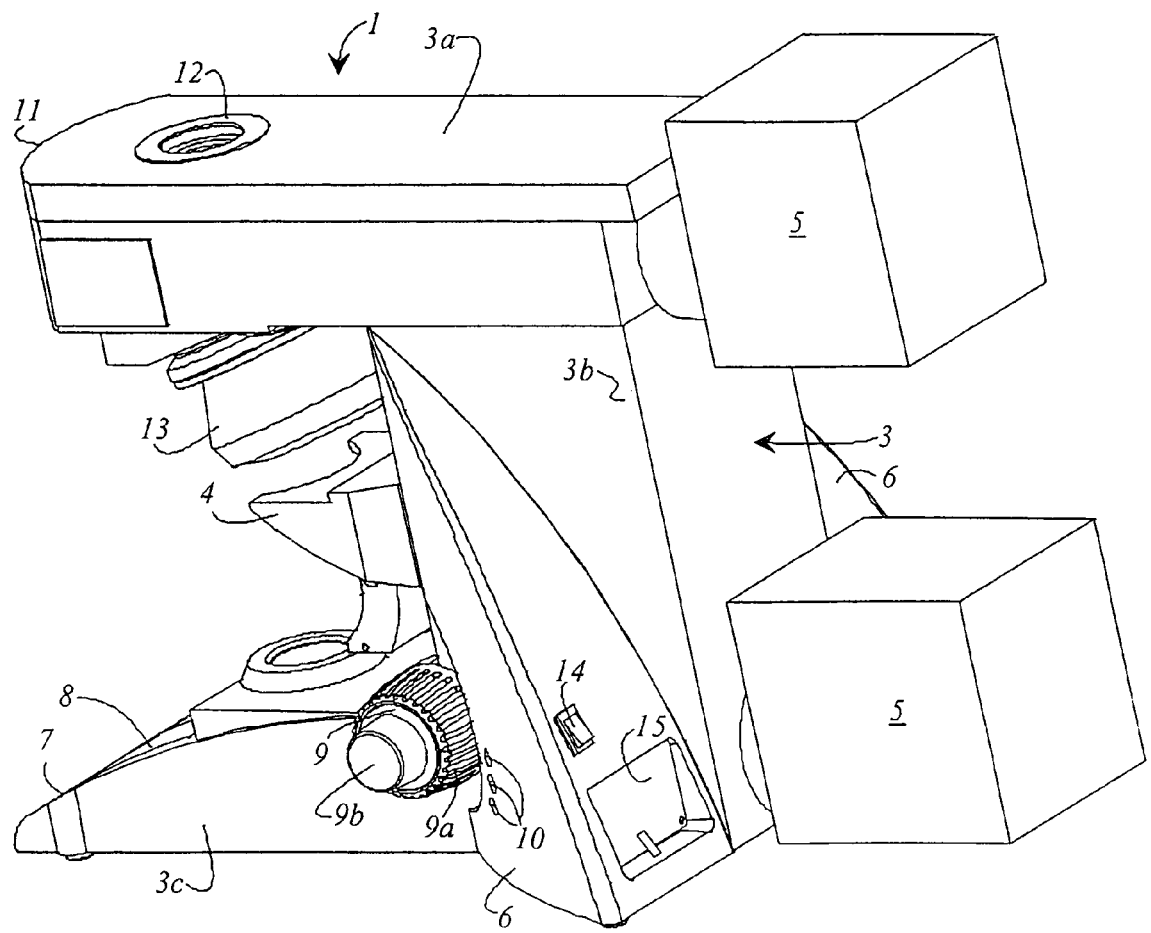
FIG. 2: a perspective view of a microscope which shows an operating knob arranged at the microscope stand.

FIG. 2 shows a microscope stand 1, whereby the operating knob is arranged at the microscope stand. The stand has a base element 3. The base element consists of three main sections which are the transverse main section 3a, the stand pillar section 3b and the stand foot section 3c. A microscope stage holding element 4 is mounted at the stand pillar section 3b. At least one light source 5 is provided at the stand pillar section 3b across from the microscope stage holding element 4. In the embodiment shown here, two light sources 5 are provided. One of the light sources 5 is responsible for the transmissive illumination and the other light source is responsible for the reflective illumination. In essence, the transverse main section 3a, the stand pillar section 3b and the stand foot section 3c have the same width. On each of both sides of the stand in the area of the stand pillar section 3c a supporting element 6 is formed. It is of special importance that each of the supporting elements 6 in the area of the stand foot section 3c is broader than the stand foot section 3c.

The stand foot section 3c has a convex curve formed opposite to the stand pillar section 3b and has a display 8 in the convex curved area 7. The display 8 can be a touch screen which allows the user to enter parameter data or to invoke special measurement methods. In case display 8 is not formed as a touch screen, actual adjusting data of the microscope 1 are displayed in visual form on display 8. Additionally, a focus knob 9 is provided as an operating knob on at least one side of the microscope stand in the area between the stand foot section 3c and the supporting element 6. For example, the microscope stage holding element 4 can be adjusted in its height by the focus knob 9. The focus knob 9 comprises of (as already known from state of art) the first and the second coaxially arranged rotating element 31 and 32. The second rotating element 32 is responsible for the fine adjusting of the microscope stage or microscope stage holding element 4. The first rotating element 31 is responsible for the coarse adjusting. It is especially advantageous to assign the fine adjusting to the second rotating element 32 and to assign the coarse adjusting to the first rotating element 31. It is also possible to assign additional functions to the operating knob 30. In the area around the operating knob 30 several actuating elements 10 are provided, by which microscope functions can be selected. The actuating elements 10 are formed as push buttons. The microscope functions are, for example, changing the filter, selecting the aperture, rotating the turret etc. At the front end 11 of the transverse main section 3a a flange 12 for an ocular is formed, which provides an optical connection with the turret 13, at which at least one objective can be mounted (not shown). At one supporting element 6 a power supply switch 14 and a socket element 15 are provided. By the socket element 15, the microscope 1 can be linked with several external operating elements. By the socket element 15, it is also possible to plug in data cable (not shown).

Figure 3:
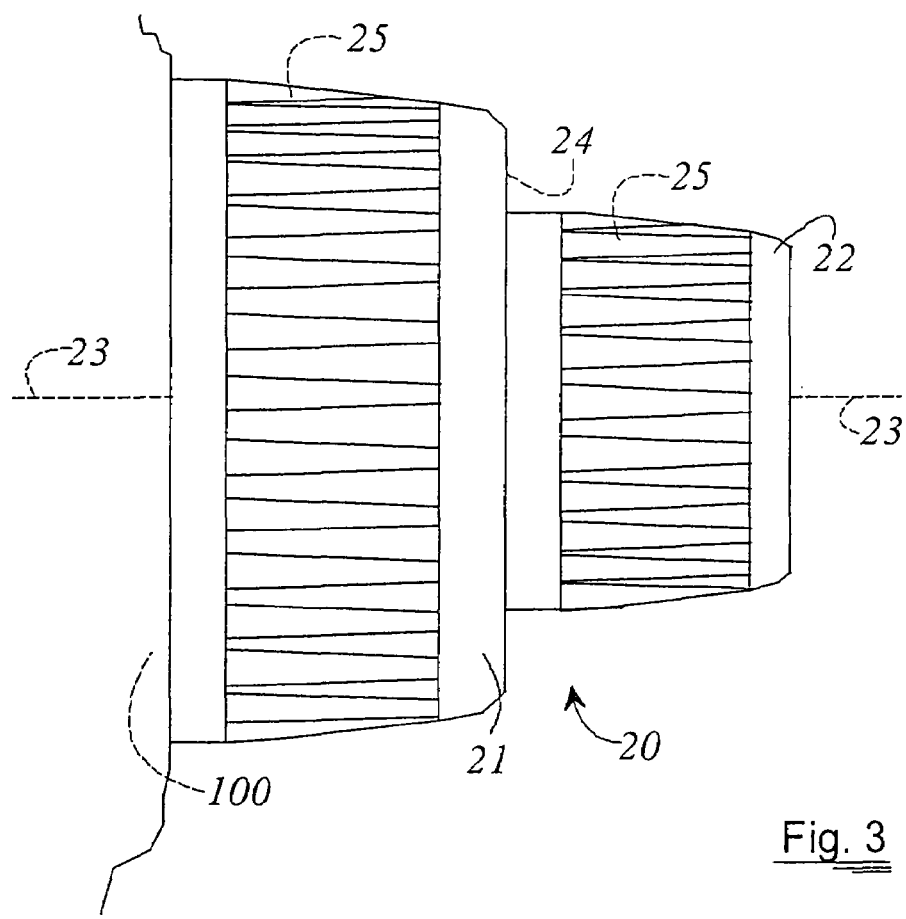
FIG. 3: a side view of a first embodiment of the operating knob.

FIG. 3 shows a side view of a first embodiment of an operating knob 20 according to the invention. Normally, the operating knob 20 is used for the coarse and the fine adjustment of an optical system 100. For example, the optical system 100 can be a standard microscope 1. The operating knob 20 according to the invention is the most relevant element for positioning. In FIG. 3 the optical system 100 is partly shown to demonstrate the arrangement of the operating knob 20 at the optical system 100. The operating knob 20 comprises of a first and a second rotating element 21 and 22 both of which are arranged coaxially around a common axis 23. The first and the second rotating element 21 and 22 are rotatable independently around the axis 23. The first rotating element 21 abuts directly at the optical system 1. The second rotating element 22 is arranged downstream of the first rotating element 21. The first and the second rotating element 21 and 22 have at least partly conical form, and the first rotating element 21 has one side directly opposing the second rotating element 22 wherein the first rotating element 21 has a larger diameter than the second rotating element 22. Additionally, the second rotating element 22 forms a circumferential step 24 at its side directly opposing to the first rotating element 21, wherein the step possesses a diameter which is approximately the diameter of the first rotating element 21. To increase the gripping safety of the fingers or of the user's hands of the optical system 100 (see FIG. 3) according to this embodiment the surface of the first and the second rotating element 21 and 22 is provided with a profile or riffle 25. The profile can be designed in the form of grooves, notches or ribs. In this embodiment the material of the first and the second rotating element 21 and 22 is an injection moulded polymer. If the operating knob 20 is made of polymer the problem of sensitiveness for coldness does not exist and the production costs are low. In this case, an additional inertia can be reached by an embedded brass batch mass.

Figure 4:
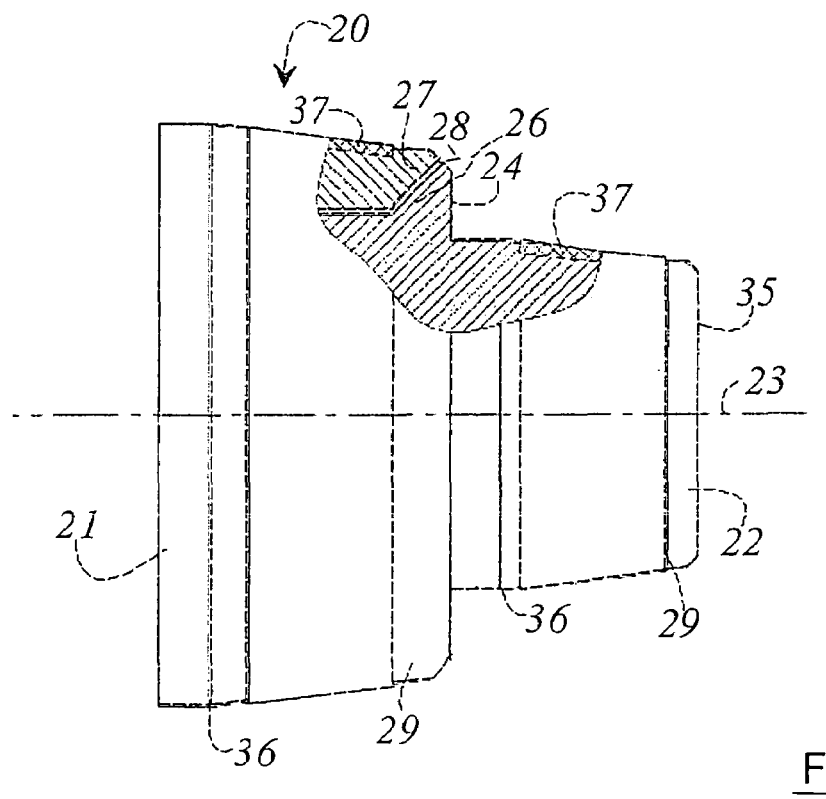
FIG. 4: a side view of the first embodiment of the operating knob whereby parts of the first and the second rotating element are shown as a sectional drawing to demonstrate the cooperation of the first and the second rotating element.

FIG. 4 shows a side view of the operating knob 20, whereby parts of the first and the second rotating element 21 and 22 are shown as a sectional drawing to demonstrate the cooperation of the first and the second rotating element 21 and 22. As already described in FIG. 3. the second rotating element 22 has a step 24 which approximately has the diameter of the first rotating element 21. The first rotating element 21 has a cone shaped depression 27, formed in the direction to the axis 23. Also step 24 of the second rotating element 22 has a cone shaped flank 26, so that both elements can be matched into one another and interact in a way that between the first and the second rotating element 21 and 22 a separating groove 28 is formed. By the separating groove 28, a free rotation of the first rotating element 21 with respect to the second rotating element 22 is possible, also the position of the separating groove 28 ensures that while actuating the second rotating element 22 no unintentionally actuation of the first rotating element 21 occurs. The separating groove 28 is formed by the step 24 in the area of the diameter of the first rotating element 21. The first and the second rotating element 21 and 22 each have a circumferential surface 29 which is dimensioned in a way that also users with large hands have sufficient contact surface. Additionally, the size difference between the first rotating element 21 (for the coarse drive) and the second rotating element 22 (for the fine drive) provides a clear distinction between both positioning elements and its functions. Further more, this remarkable difference helps that the user with short fingers does not hook with his inner finger sides and at the front side 35 of the second rotating element 22 while actuating the first rotating element 21 (coarse focus drive), thus while gripping above the second rotating element 22. Nevertheless, the diameter of the second rotating element 22 is chosen large enough so that an exact adjustment is possible. In this embodiment, the circumferential surface 29 has no profile with grooves, notches or ribs. The tactile response with respect to the end of the first or the second rotating element 21 or 22 is detected by a geometrical change from a cone to a cylinder which results in a clearly feelable circumferential edge 36. This circumferential edge 36 signals "End of the operating knob". In a second embodiment, the first and the second rotating elements 21 and 22 are made of a fine machined stainless steel. The high inertia of this material has a positive effect on the adjustment accuracy. A rubber inlay 37 in the first and the second rotating element 21 and 22 prevents a too large heat dissipation from the fingers tips and ensures an grip without slipping.

Figure 5:
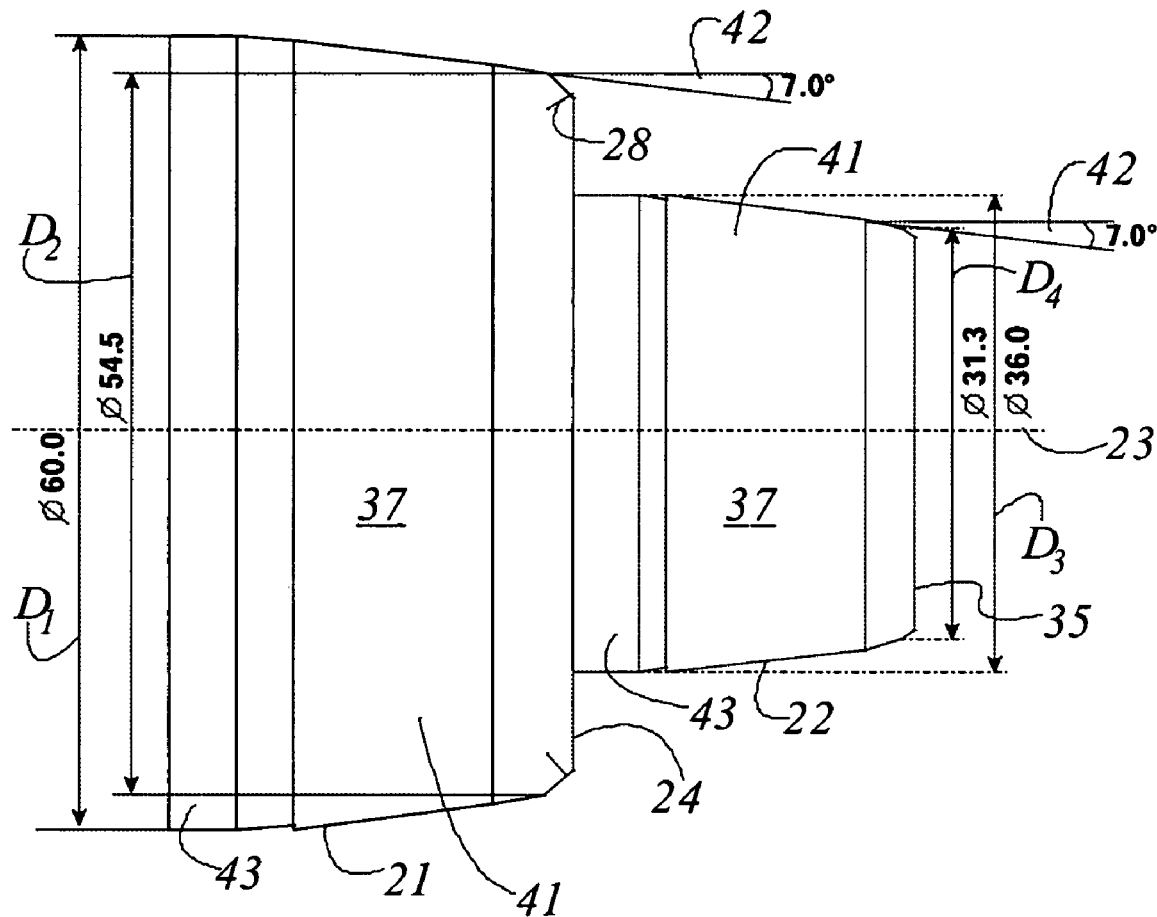
FIG. 5: a side view of a second embodiment of the operating knob which comprises the indication of dimensions for each element of the operating knob.

FIG. 5 shows a side view of the second embodiment of the operating knob 20 which is provided with dimensions for the elements of the operating knob 20. The operating knob 20 has a first and a second rotating element 21 and 22 which both partly have a conical body 41. Each conical body 41 has a cylindrical step 43 with a width of 9 mm which enables the provision of a scale and additionally provides an indication of the ends of the rotating elements 21 and 22. Each conical body 41 has a conical angle 42 of 7°. Together with the rubber inlay 37 this angle is sensed as comfortable and in comparison with broader angles this angle is experienced as a better prevention from slipping off. To exclude an actuation of the respective other rotating element 21 or 22 while positioning, the separating groove 28 is positioned above the step 24 between both positioning elements. The first rotating element 21 has a maximum diameter $D_1$ of 60.0 mm close to the optical system. In the area of the separating groove 28 the first rotating element 21 has a diameter $D_2$ of 54.5 mm. Opposite to the first rotating element 21, the second rotating element 22 has a maximum diameter $D_3$ of 36.0 mm. Further, the second rotating element 22 has a diameter $D_4$ of 31.3 mm in the area of the front side 35 of the second rotating element 22.

Figure 6:
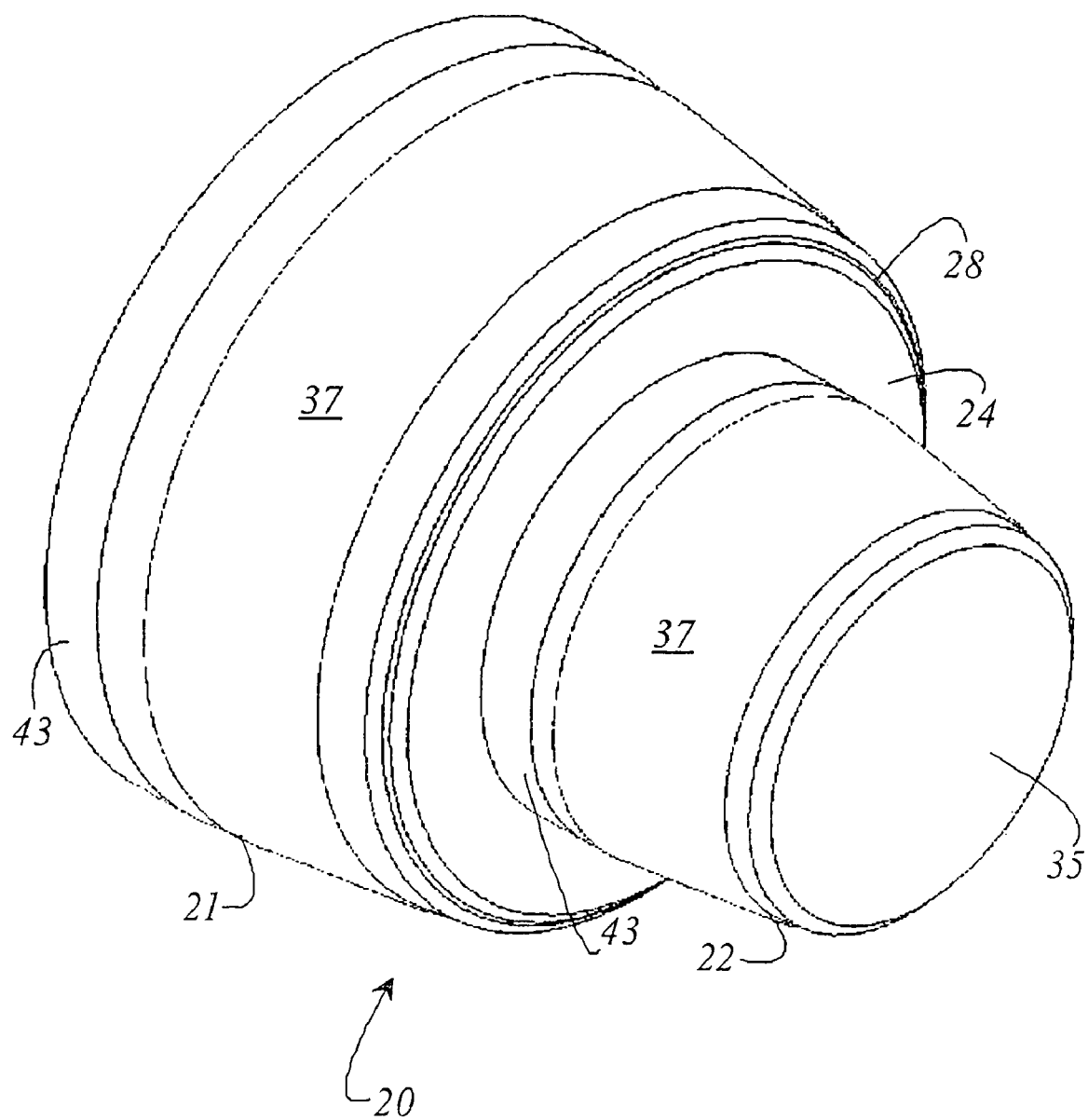
FIG. 6: a perspective view of the second embodiment of the operating knob.

FIG. 6 shows a perspective view of the second embodiment of the operating knob 20. The second rotating element 22 is provided with a step 24 which has approximately the diameter of the first rotating element 21 of. Starting from the front side 35 of the second rotating element 22, the second rotating element 22 has a conical body 41 which ends in a cylindrical step 43. At the cylindrical step 43 a circumferential step 24 is formed. Between the first rotating element 21 and the circumferential step 24 a separating groove 28 is formed. The first rotating element 21 is also provided with a conical body 41 which also ends in a cylindrical step 43. A portion of the conical body 41 is provided with a rubber inlay 37 or with a profile.

To conclude, it should more particularly be emphasized that the exemplary embodiments selected purely arbitrarily above are merely used to describe the teaching according to the invention, but do not restrict it to these exemplary embodiments.

What is claimed is:

1. An operating knob for an optical system comprises: a first and a second coaxially arranged rotating element, wherein the first and the second rotating element are independently rotatable, the first rotating element rests against the optical system, the second rotating element is arranged downstream of the first rotating element, the first and the second rotating element have at least partly conical form, and that the first rotating element has one side directly opposing the second rotating element and has a larger maximum diameter than the second rotating element and a step is formed at the side of the second rotating element directly opposing the first rotating element, wherein the step possesses a diameter which is approximately the diameter of the first rotating element close to the second conical rotating element and wherein the first conical rotating element has a maximum diameter ($D_1$) close to the optical system from 57.0 to 63.0 mm, and a diameter ($D_2$) close to the second conical rotating element from 51.5 to 56.5 mm and wherein the second conical rotating element has a maximum diameter ($D_3$) close to the first conical rotating element from 34.0 to 38.0 mm and close to a front end from 29.3 to 33.3 mm.

2. The operating knob as defined in claim 1, wherein the first conical rotating element has a maximum diameter ($D_1$) close to the optical system of 60.0 mm, and a diameter ($D_2$) close to the second conical rotating element of 54.5 mm and wherein the second conical rotating element has a maximum diameter ($D_3$) close to the first conical rotating element of 36.0 mm and close to the front end of 31.3 mm.

3. The operating knob as defined in claim 1, wherein the first rotating element and the second rotating element have a conical body, which is followed by a cylindrical step at the end with the maximum diameter.

4. The operating knob as defined in claim 3 wherein the optical system is a microscope.

5. The operating knob as defined in claim 3 wherein both the first and the second rotating element exhibit on a circumferential surface a profile in the form of grooves, notches or ribs.

6. The operating knob as defined in claim 3 wherein both the first and the second rotating element exhibit on a circumferential surface a rubber inlay.

7. The operating knob as defined in claim 3 wherein both the first and the second rotating element have a partly conical body and each body has a cylindrical step at its wider part.

8. The operating knob as defined in claim 7 wherein the conical body of the first and the second rotating element exhibits an angle of 5° to 10° with respect to a rotating axis of the operating knob.

9. The operating knob as defined in claim 8 wherein the angle exhibits 7°.

10. The operating knob as defined in claim 3, wherein the cylindrical step has a width of 9 mm.

11. The operating knob as defined in claim 1, wherein a separating groove is formed by the step between the first and the second rotating element.

12. The operating knob as defined in claim 11, wherein a cone shaped depression is formed in the direction to the axis of the first rotating element, wherein the step of the second rotating element has a cone shaped mount, and wherein the cone shaped depression and the cone shaped mount are attached to each other such that the separating groove between the first and the second rotating element is formed exactly at the end of an envelope surface of the first rotating element.

13. The operating knob as defined in claim 1, wherein the first and the second rotating element is made from an injection moulded polymer.

14. The operating knob as defined in claim 1, wherein the first and the second rotating element is made from a fine machined stainless steel.

15. A microscope comprising the operating knob as claimed in claim 1 in turn comprising: a first and a second coaxially arranged rotating element, wherein the first and the second rotating element are independently rotatable, the first rotating element rests against an optical system, the second rotating element is arranged downstream of the first rotating element, the first and the second rotating element have at least partly conical form, and that the first rotating element has one side directly opposing the second rotating element and has a larger diameter than the second rotating element and a step is formed at the side of the second rotating element directly opposing the first rotating element, wherein the step possesses a diameter which is approximately the diameter of the first rotating element.

16. The microscope as defined in claim 15 wherein both the first and the second rotating element exhibit on a circumferential surface a profile in the form of grooves, notches or ribs.

* * * * *

UNITED STATES PATENT AND TRADEMARK OFFICE
CERTIFICATE OF CORRECTION

PATENT NO.         : 7,031,056 B2                                         Page 1 of 1
APPLICATION NO. : 10/815066
DATED              : April 18, 2006
INVENTOR(S)        : Katja Peter et al.

It is certified that error appears in the above-identified patent and that said Letters Patent is hereby corrected as shown below:

Title page, item [73]
Change the spelling of second Assignee's name to:

Fraunhofer Gesellschaft zur Foerderung der Angewandten Forschung e.V.

Title page, item [75]
Change the spelling of first inventor's name to:

Katja Peter

Signed and Sealed this

Twelfth Day of September, 2006

JON W. DUDAS
*Director of the United States Patent and Trademark Office*